Aug. 21, 1962   R. DANGER   3,049,803
MOTION TRANSFORMING DEVICE AND APPARATUS INCORPORATING SAID DEVICE
Filed Jan. 28, 1959   4 Sheets-Sheet 1
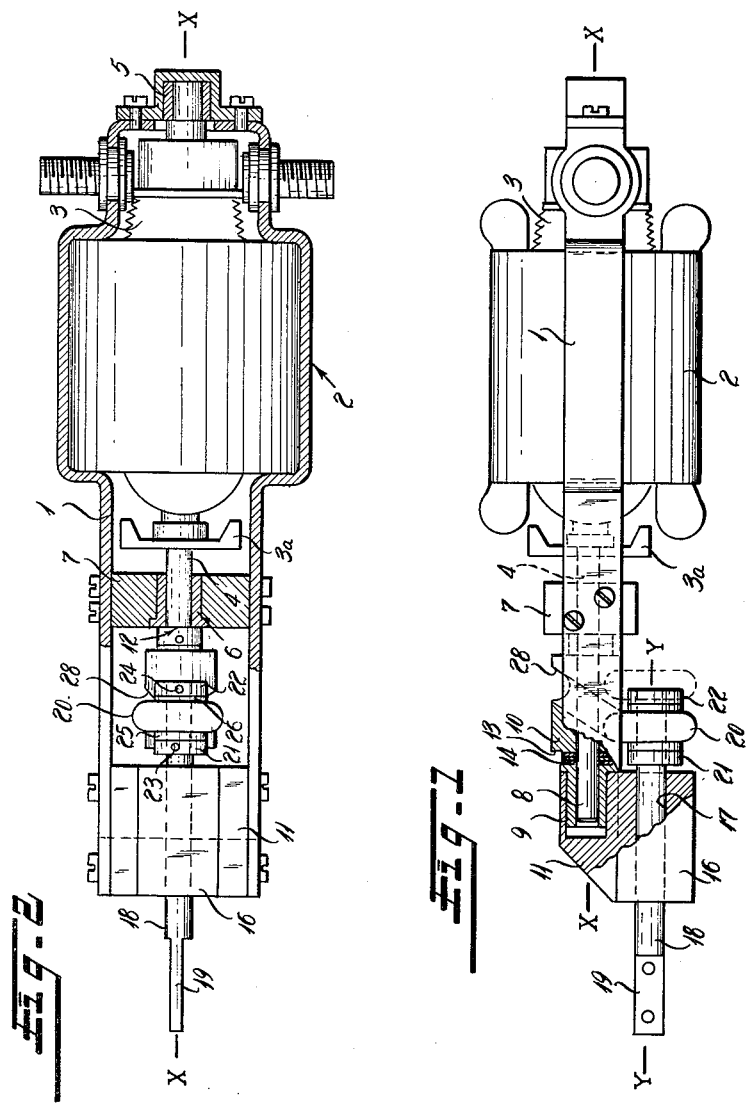
INVENTOR
ROGER DANGER
BY Strauch, Nolan & Neale
ATTORNEYS

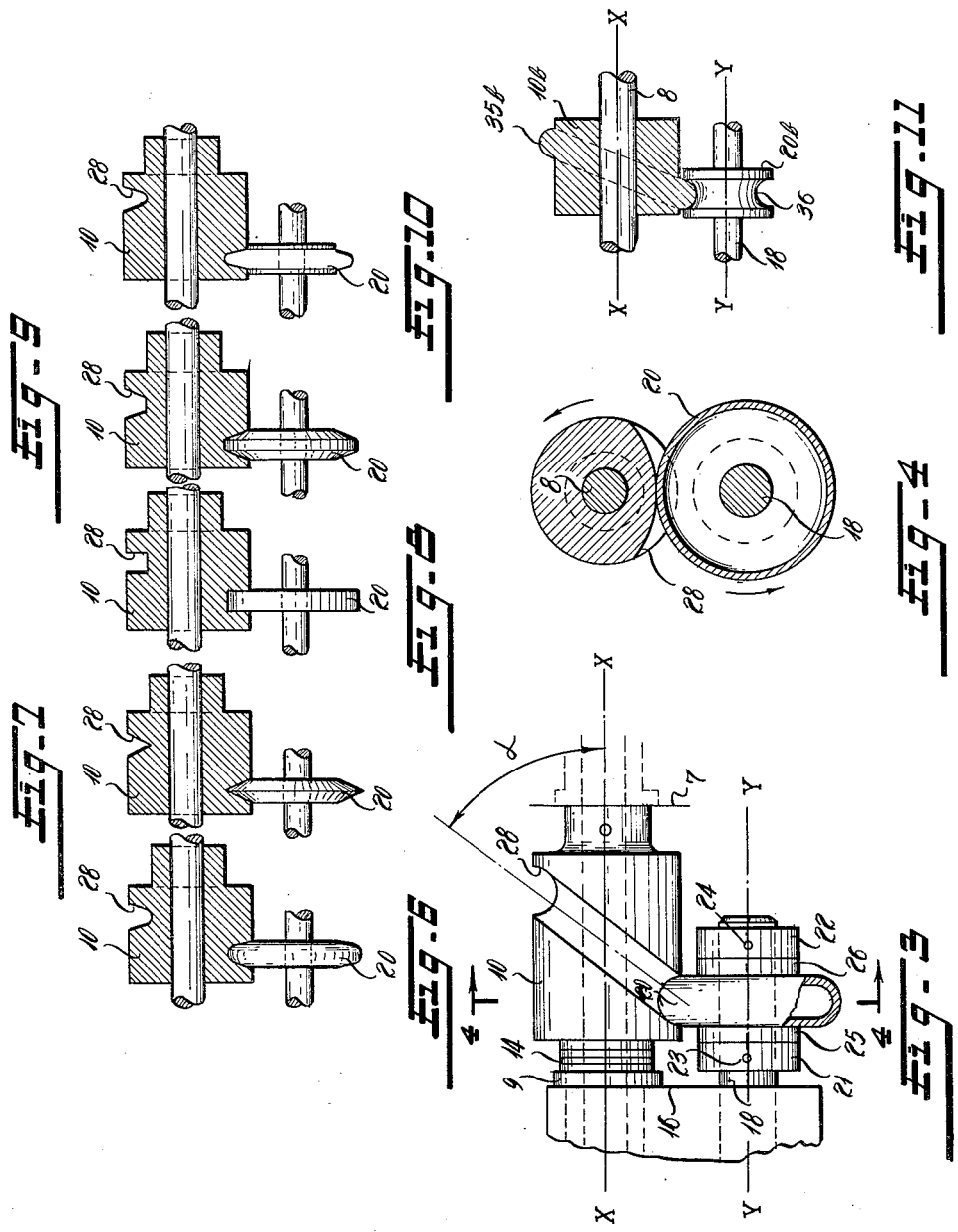

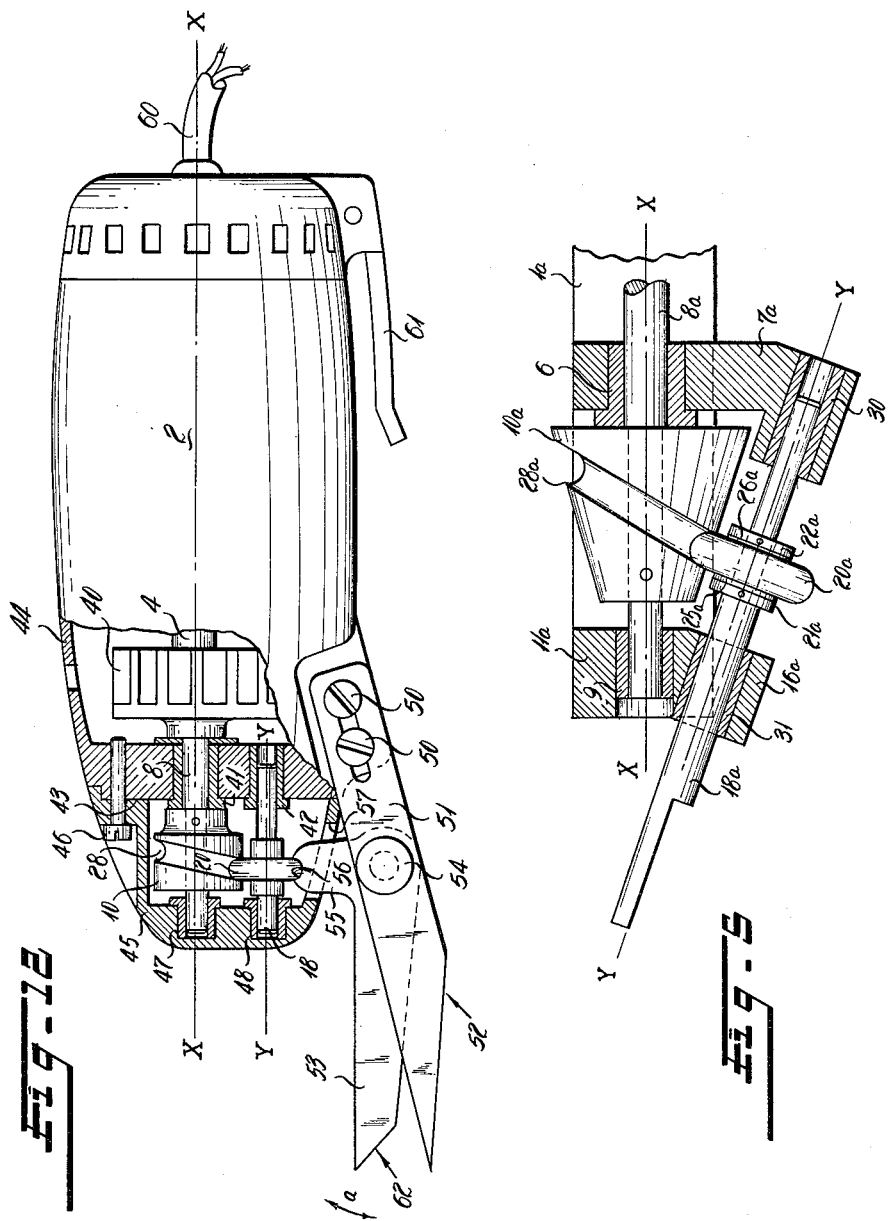

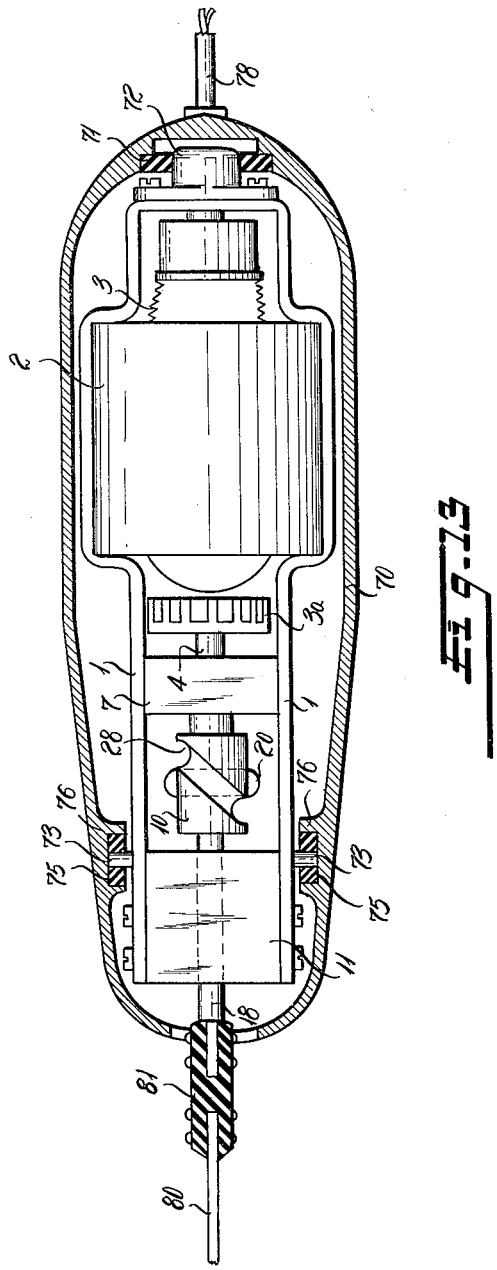

United States Patent Office 3,049,803
Patented Aug. 21, 1962

3,049,803
MOTION TRANSFORMING DEVICE AND APPARATUS INCORPORATING SAID DEVICE
Roger Danger, Paris, France, assignor, by mesne assignments, of fifty percent to Inventions Finance Corporation, a corporation of Delaware
Filed Jan. 28, 1959, Ser. No. 789,689
Claims priority, application France Jan. 31, 1958
18 Claims. (Cl. 30—228)

The present invention relates to a device for transforming rotary motion into oscillatory motion and more particularly to such a device in which the oscillatory motion is at relatively high speed.

An object of the invention is to provide a simple device for transforming rotary motion into oscillatory motion comprising simple, strong and light elements which have but little inertia and are therefore capable of resisting high stresses due, for example, to high operational speeds.

Another object of the invention is to provide a motion transforming device which is compact and capable of giving long trouble-free service, rendering it suitable for small equipment such as hand tools and household appliances.

Another object of the invention is to provide apparatus incorporating the device of the invention which are compact, simple in construction and have a low power consumption.

According to the invention, the device for transforming rotary motion into oscillatory motion comprises, a support, a rotary driving member and an oscillatory driven member mounted in the support, the axis of rotation of the rotary member being disposed substantially in the plane of oscillation of the driven member, endless first connecting means provided on the driving member and disposed substantially in a plane inclined relative to said axis, and second connecting means provided on the driven member and engaging said first connecting means for operatively interconnecting the driving and driven members, whereby rotation of the driving member causes oscillation of the driven member in said plane of oscillation.

In one advantageous embodiment of said device, said driven member is a light-weight hollow roller consisting of, for example, two coaxial shells held together by suitable means, such as welding along the peripheral edges of said shells.

In another embodiment of said device, the axes of the driving and driven members are at an angle to one another in said plane.

As will be apparent from the ensuing description, the motion transforming device of the invention is applicable to many types of machine tools, hand tools and other equipment comprising an element to which an oscillating or reciprocating motion is to be imparted.

In one combined form, the device of the invention is adapted to actuate scissors or shears, the driven member of the device being operatively connected to one of the two cutting blades of the scissors.

In another combination, the device is adapted to impart reciprocating motion to a knife which has a smooth or toothed cutting edge or a saw blade, the driven member of the device being operatively connected to said knife.

Further objects and features of the invention will be apparent from the ensuing description, which reference to the accompanying drawings, to which the invention is in no way restricted.

In the drawings:

FIG. 1 is a side elevational view, partly in axial section, of a device according to the invention;

FIG. 2 is a plan view, partly in axial section, of the underside of the device shown in FIG. 1;

FIG. 3 is a partial side elevational view, on an enlarged scale, of the driving and driven members of the device shown in FIG. 1;

FIG. 4 is a sectional view taken along line 4—4 of FIG. 3;

FIG. 5 is a partial side elevational view, partly in axial section, of a modification of the driving and driven members, their axes being at an angle to one another;

FIGS. 6, 7, 8, 9 and 10 are partial axial sectional views of other forms of the groove in the driving member and the periphery of the driven member;

FIG. 11 is an axial sectional view of another modification of the driving and driven members;

FIG. 12 is a side elevational view, partly in axial section, of a motor-driven scissors or shears apparatus incorporating the device of the invention, and FIG. 13 is an axial sectional view of a motor-driven reciprocating knife apparatus incorporating the device of the invention.

In the embodiment shown in FIGS. 1 to 4, the device comprises a frame or support 1 in which is mounted an electric motor, generally indicated by the reference numeral 2 and comprising a rotor 3 and cooling fan 3a. The rotor shaft 4, having an axis XX, is mounted in the frame 1 by suitable bearings, such as bearings 5 and 6, the bearing 6 being supported in the frame 1 by a transverse support 7 fixed to the frame 1 in a suitable manner. The shaft 4 has an extension 8 of reduced diameter which is rotatably mounted in a suitable bearing, such as the bearing 9 fixed in the forward transverse end member 11 rigid with the frame 1.

A cylindrical driving member 10 is rigidly secured to the extension 8 of the shaft 4, the end face 12 of said driving member being supported by the bearing 6. The end 13 of the member 10 is resiliently supported by the member 11 of the frame 1 through the medium of a series of washers 14 the purpose of which is to take up axial play between the member 10 and the support 7 and member 11 of the frame 1.

The member 11 of the frame has a depending portion 16 in which is formed a bore 17 parallel with the axis XX. Slidably mounted in the bore 17 is a slide 18 having one end 19 adapted to be operatively connected to the element the device of the invention is intended to oscillate. If desired, the slide 18 may be prevented from rotating about its reciprocation axis YY, parallel with the axis XX, by any suitable means such as keying means (not shown).

The end of the slide 18 remote from the end 19 carries, rotatably mounted thereon, a roller 20 which is prevented from moving longitudinally of the slide by collars 21 and 22 fixed to the slide 18, for example by pins 23 and 24, anti-friction washers or bearings 25 and 26 being interposed between the roller 20 and the collars 21 and 22.

As seen in FIGS. 3 and 4, the roller 20 or driven member is engaged in connecting means in the form of an annular groove or recess 28 formed in the driving member 10. In the presently-described embodiment, this annular groove 28 is disposed in a plane forming an angle α with the axis XX (FIG. 3), the radial sectional shape of the periphery of the roller 10 is semicircular and the groove 28 has a similar radial sectional shape.

The device just described operates in the following manner:

When current is supplied to the motor 2 through conductors (not shown), the shaft 4 rotates at high speed and drives the driving member 10. Owing to the inclination of the plane in which the groove 28 is disposed, the roller 10 engaged in this groove is caused to reciprocate along the axis YY between one extreme position shown in full line and another extreme position shown in dot-dash line in FIG. 1.

It will be understood that the amplitude and speed of this reciprocation depend on the inclination $\alpha$ of the plane of the groove 28 relative to the axis XX and the rotational speed of the motor shaft 4.

In the modification shown in FIG. 5, the driving member 10a, fixed to the shaft 8a is conical and the inclined groove 28a therein engages with a roller or driven member 20a which is rotatably mounted on a slide 18a, movement of the roller 10a longitudinally of the slide 18a being prevented, for example by the provision of collars 21a, 22a, and anti-friction washers 25a and 26a is described hereinbefore. The axis YY of reciprocation of the slide 18a and roller 10a lies in the same plane as the axis XX of the extension 8a of the shaft 4a, but at an angle to this axis. A further bearing 30 carried by an extension on the member 7a rigid with the frame 1a supports one end of the slide 18a whereas the other end of the latter is slidably mounted in a further bearing 31 inserted in the depending portion 16a of the transverse end member 11a of the frame 1a.

This arrangement permits obtaining the ideal inclination of the motor shaft relative to the plane of action of the tool reciprocated through the medium of the roller 10a, since it is not always possible to arrange the motor shaft at the same angle as the axis of reciprocation of the tool-actuating driven member 20.

In FIGS. 3 to 5 the radial sectional shape of the groove 28 and the periphery of the roller 10 have been shown to be substantially semi-circular. However, the invention is not limited to such a shape. FIGS. 6 to 10 show, by way of example, other possible shapes, the choice of which depends on the load carried by the driven member or the requirements of the element reciprocated by the roller. FIGS. 6, 7, 8 and 9 show respectively an oval, triangular, square and trapezoidal radial sectional shape for the groove 28 in the driving member 10, the radial sectional shape of the periphery of the roller 20 corresponding thereto. FIG. 10 shows a periphery of the roller 20 whose radial sectional shape is that of a conventional gear tooth of involute form, the flanks of the groove 28 engaging the flanks of the roller periphery in the manner of involute gear teeth.

Further, FIGS. 3 to 11 show the connection between the driving member 10 and the driven member 20 to be by way of a groove or female portion in the member 10 and a peripheral or male portion on the driven member 20. However, if desired, these arrangements could be reversed, for example as shown in FIG. 11, in which the driving member 10b is provided with an annular rib 35 disposed in a plane inclined relative to the axis XX of rotation and the periphery of the driven member or roller 20b is provided with a corresponding groove 36.

The device of the invention has many applications some of which will now be mentioned.

The slide 18 can be connected to recessing, abrasive or riveting tools, saw blades, files or any tool which undergoes an oscillating motion.

The device of the invention can be adapted to actuate or oscillate:

(a) Elements for massaging the human body, since either low or high speeds or long or short reciprocating movements can be obtained with the device of the invention.

(b) Sifting of filtering screens.

(c) A brush, for example a tooth brush, shoe brush or industrial or household brushes, or a vibrating brush incorporated in a vacuum cleaner, which ensures a deep cleaning of carpets. It will be observed that the driving member of the device can be driven by the output shaft of the motor of the vacuum cleaner.

(d) Household clippers or hairdressers' clippers of the reciprocating type; the low cost price and the light weight of the device would permit the construction of light portable electric clippers.

The device of the invention could be advantageously substituted for the complex system of the cloth-feed dog operative during the stitching stroke of the needle. This cloth-feed dog could be operatively connected by the motion transforming device to the drive of the thread-carrying bobbin, the oscillatory movement of the bobbin-carrying shaft being synchronized by means of the motion transforming device with the forward and rearward motion of said dog.

The motion transforming device could be connected to a piston sliding in a cylinder for the compression or discharge of liquids, gases or colloids. For example, the device could actuate a pneumatic type inflating device or a grease injector.

Two examples of applications of the motion transforming device will now be described.

In the apparatus shown in FIG. 12, the device of the invention is adapted to drive one of the blades of a pair of scissors or shears. This combination comprises an electric motor, generally indicated by the reference numeral 2, whose rotor shaft 4 carries a motor cooling fan 40. The driving member 10 is rigidly mounted on the extension 8 of the shaft 4 and reciprocates the driven member 20 rigid with the slide 18 along the axis YY which is parallel with, and lies in the same plane as, the axis YY of the motor shaft 4. Bearings 41 and 42 inserted in the end transverse wall 43 of the motor housing 44 support the shaft extension 8 and the slide 18 respectively. A cap 45 fixed to the housing 44, such as by screws 46, carries further bearings 47 and 48 which respectively support the other ends of the shaft extension 8 and the slide 18.

Secured to a depending portion of the housing 44, such as by screws 50, is one of the cutting blades 51 of scissors or shears 52, the other blade 53 being pivotably mounted on the blade 51 by a pivot stud 54. The blade 53 is provided with an extension 55 in which is formed a recess 56 adapted to slidably engage the periphery of the roller or driven member 20. The extension 55 freely extends through an aperture 57 formed in the cap 45 for this purpose. It will be understood that the reciprocation of the roller 20 along the axis YY, caused by rotation of the driving member 10, will cause oscillation of the blade 53 about the axis of the stud 54 as shown by arrows a.

The electric motor 2, to which current is supplied by way of a lead 60, is controlled by a switch 61. If desired, means could be provided for regulating the speed of the electric motor, that is, the cutting rate of the scissor blades 51 and 53.

It will be observed that the end of the blade 53 is provided with an approximately 45° chamfer at 62. This chamfer constitutes safety means which pushes out of the way any object thicker than the cutting passage and in particular ensures that the finger of the user is not accidentally cut by the ends of the blades 51 and 53.

In the apparatus shown in FIG. 13, the device illustrated in FIGS. 1 and 2 is resiliently mounted in a housing 70 by a three-point mounting arrangement. The latter comprises a resilient ring or block 71, for example composed of rubber, which maintains the cup 72 of the bearing 5 of the electric motor 2 in the end of the housing 70. Further, two studs 73 fixed to the forward part of the frame 1 of the device extend into resilient rings or blocks 75, for example composed of rubber, inserted in bosses 76 provided in the housing 70. In this way, vibration of the device is absorbed by the rings 71 and 75. Current is supplied to the motor 2 by way of the lead 78.

The reciprocating slide 18 is secured to a knife or saw blade 80 through the medium of a resilient connector 81, for example composed of suitable rubber, which tends to insulate the variable load on the knife in the course of cutting from the elements of the motion transforming device and the motor, thereby reducing the stresses on these elements and minimizing wear.

When using the device of the invention for reciprocating a knife blade, good results have been obtained with about 7000 reciprocations of the blade per minute, the amplitude of the reciprocations being about 7 mm. When cutting rubber or plastic material, about 9000 reciprocations per minute and an amplitude of about 9 mm. have been found satisfactory.

In the case of scissors or shears, satisfactory results have been obtained with about 2500 to 3500 reciprocations per minute of the driven member, the amplitude of the reciprocations being about 2 to 3 mm. This small amplitude, high-speed actuation of the scissors together with short cutting blades produces a very clean cut and permits cutting along curves having a small radius of curvature. Furthermore, small amplitude movements of the blades render the scissors very safe to use.

The device of the invention has the following advantages among others:

(a) The arrangement comprises the minimum number of elements, namely, three basic elements: the driving member 10, the driven member 20 and the slide 18, which are very cheap to make.

(b) Said three basic elements are strong without any weak points and coact under good conditions of stress and friction.

(c) As the basic elements are light, they have but slight inertia and the power of the driving motor may be reduced accordingly for a given operational speed and load.

(d) Rotational mounting of the roller 20 minimizes friction between the driving member and roller.

(e) As the axis of reciprocation of the driven member is parallel with the axis of rotation of the driving member, resistance offered by the driven member in operation is in a direction parallel with the axis of the driving member, with consequential less stress and wear in the bearing of the driving member.

(f) The contact between the driving and driven members occurs near the axis of these members, so that bending stresses in the shaft 8 and the slide 18 are minimized.

(g) Owing to features b–f, heating of the basic elements in operation is practically nil.

(h) Owing to features a, b and c, the overall size of the device with its driving motor is reduced to a minimum, and for this reason the device can be incorporated in portable apparatus and hand-tools, for example household equipment.

It is clear from the foregoing advantages that the device is a considerable improvement over known types of motion transforming devices, such as crank arrangements, which are, moreover, constructionally unsuitable for the high operational speeds mentioned hereinbefore.

Although specific embodiments of the invention have been described, many modifications and changes may be made therein without departing from the scope of the invention as defined in the appended claims.

The driven member 20 can be rigidly secured to the slide 18 and be in the form of a lug shaped to slidably engage the groove 28. The slide 18 can be rotatably mounted or keyed against rotation; it can be mounted on the frame 1 by means of a dovetail arrangement. The driving member 10 can be adapted to drive the element to be reciprocated directly without interposition of the roller 20; for example, in the embodiment shown in FIG. 12, the extension 55 can be shaped to slidably engage the groove 28 so as to be directly oscillated about the stud 54 by this groove. This roller 20 can be solid or hollow and can be recessed on both sides, as shown in FIG. 12, to satisfy the requirements of an oscillating element operatively connected thereto, such as the blade extension 55.

The groove 28 has been described as lying in a plane inclined relative to the axis XX. If desired, this groove can be modified so as to partially deviate from this plane, thereby varying the velocity of the reciprocation of the driven member in accordance with operational requirements. For example, the groove 28 could lie in a slightly curved plane disposed transversely of the axis XX.

Means can be provided for regulating the rotational speed of the driving member 10, such as gearing or electrical means, such as a resistance, which regulates the operation of the electric motor. Likewise, the amplitude of the reciprocation imparted to the element driven by the device of the invention could be made regulatable, such as by a change-speed linkage arrangement or gearing.

The motor 2 can be other than electric, such as a fluid motor. The driving member 10 could be driven by a flexible shaft.

It will be understood that the groove 28 in the driving member 10 corresponds to the surface generated by the cooperating rib or periphery of the driven member when the latter is reciprocated in the required manner in each rotation of the driving member.

Having now described my invention what I claim as new and desire to secure by Letters Patent is:

1. A power operated scissors of the type including a support, a source of rotary motion connected to a rotary driving member mounted on said support, a first cutting blade, and a second oscillatory cutting blade, an oscillatory driven member mounted in bearings on said support for linear reciprocating motion, a first connecting means mounted on said rotary driving member, and a second connecting means mounted on said driven member and engaging both said first connecting means and said oscillatory cutting blade, whereby rotation of the rotary driving member causes oscillation of said oscillatory cutting blade.

2. Power actuated scissors in accordance with claim 1, in which said oscillatory driven member is mounted for linear reciprocating motion along a given axis, and wherein the rotational axis of said rotary driving member and said given axis are in the same plane.

3. An electrically power operated cutting shears having a motor and two blades, one of which blades is mounted for rotary oscillation; a motion conversion system comprising a support, a rotary driving member and an oscillatory driven member mounted on the support, the axis of rotation of the driving member and the axis of reciprocation of the driven member being disposed in substantially the same plane, first connecting means provided on the driving member and having a continuous camming guide, second connecting means provided on the driven member and engaging said guide for operatively interconnecting the driving and driven members, whereby rotation of the driving member causes oscillation of the driven member; said driven member being operatively connected to one of said blades.

4. An electrically power operated cutting shears as defined in claim 3 wherein said guide comprises an endless groove formed in the driving member and in which said second connecting means comprises a continuous rib formed on said oscillatory driven member.

5. An electrically power operated cutting shears as defined in claim 4 wherein said rib is formed of two coaxial shells secured together along the peripheral edges thereof.

6. An electrically power operated cutting shears as defined in claim 4 wherein said rib is a hollow light weight member.

7. An electrically power operated cutting shears as defined in claim 3 wherein said guide comprises an endless rib formed on said driving member and disposed in a plane inclined relative to the axis of rotation thereof, and in which said second connecting means is provided with a continuous groove formed therein and engaging said rib, said groove being rotary about the axis of oscillation of said second connecting means.

8. An electrically power operated cutting shears as defined in claim 3 wherein the rotational axis of said driving member and the axis of oscillation of said driven member are parallel.

9. An electrically power operated cutting shears as defined in claim 3 wherein the rotational axis of said rotary driving member and the axis of oscillation of said driven member are inclined with respect to one another.

10. An electrically power operated cutting shears, comprising a motor and two blades, a motion conversion system comprising a support, a rotary driving member and a reciprocatory driven member mounted in the support, the axis of rotation of said driving member lying in the same plane as the axis of reciprocation of the driven member, an annular groove concentric with said axis of rotation provided in the driving member and disposed in a plane inclined relative to said axis of rotation, and a rib provided on the driven member and permanently engaged with said groove for operatively interconnecting the driving member and the driven member, said driven member being operatively connected to one of said blades.

11. An electrically power operated cutting shears as defined in claim 10, wherein said driven member is rotatably mounted in said support by a slide, and wherein said driven member is only rotatably moveable on said slide.

12. A power shear comprising a casing, a motor mounted in said casing, a first cutting blade fixed to said casing, a second cutting blade pivotally coupled to said first blade to form a scissors, a drive shaft on said motor, a drive connection between said motor shaft and said second blade comprising a drive member carried by the shaft of said motor and having a cam drive section with a continuous peripheral camming groove, a first cam follower cooperating with said groove, means mounting said first cam follower for reciprocal movement with respect to said shaft, and a second cam follower fixed to said second blade and coacting with said first cam follower to impart pivotal movement to said second blade.

13. A power shear as set forth in claim 12, wherein said means mounting said first cam follower comprises a pair of axially spaced bearings, means supporting said bearings parallel to said motor shaft, and an auxiliary shaft reciprocal in said bearings and having said first cam follower mounted thereon.

14. A power shear as defined in claim 13 wherein said first cam follower comprises a wheel having its periphery slidably seated within said groove, said second cam follower comprises a projection having an end recess therein slidably engaging the periphery of said wheel and said shear further including means for regulating the speed of said driving member.

15. A power operated cutting shear having a motor and a pair of cutting blades, one of said blades being pivoted with respect to the other, a driving member connected to said motor, a slide mounted in bearings for linear reciprocating motion along an axis parallel to the axis of said driving member, an endless groove in said driving member concentric therewith and disposed in a plane inclined relative to the axis thereof, a projection on said pivoted blade extending near said slide and having a groove in its end, and a roller rotatably mounted on said slide and fixed against axial motion therealong, said roller having opposite portions seated in said endless groove of the driving member and the end groove of the pivoted blade projection.

16. A power operated cutting device comprising a frame, a motor in said frame, a shear blade fixed to the frame, a second blade pivotably mounted with respect to said fixed blade, a rotatable driving member connected to the shaft of said motor, a slide mounted in bearings for linear reciprocating motion along a fixed axis in the same plane as the axis of said driving member and motor shaft, a first annular connecting means on said driving member concentric therewith and disposed in a plane inclined relative to the axis thereof, a projection on said second blade having an end portion extending toward said slide, and a second connecting means mounted on said slide and fixed against axial motion therealong and having portions engaging said first connecting means and the end portion of said shear blade projection whereby rotation of the motor shaft causes oscillatory movement of the second blade with respect to the first blade.

17. A portable high speed electric scissors of the type including a support, a rotary electric motor on said support and a pair of cutting blades of which one is mounted on the support for limited oscillatory motion, a first member mounted on said support for purely rotary motion under the driving influence of said motor, a second member mounted on said support for purely reciprocatory motion along an axis coplanar with the rotation axis of said first member, a rotary element mounted on said second member for reciprocation therewith and for free rotation about the axis of reciprocation thereof, said second member being connected to a movable one of said blades; and cooperating interfitting peripheral groove and rib formations on said first member and on said element, to transmit the rotary motion of said first member into reciprocation of said second member essentially by the use of rolling frictional forces only.

18. A portable high speed electric scissors of the type including a support, a rotary electric motor on said support and a pair of cutting blades of which one is mounted on the support for limited oscillatory motion, a first member mounted on said support for purely rotary motion under the driving influence of said motor, a second member mounted on said support for reciprocatory motion along an axis coplanar with the rotation axis of said first member, at least a part of said second member being freely rotatable about the axis of reciprocation of said member, said second member being connected to a movable one of said blades; and cooperating interfitting peripheral groove and rib formations on said members, to transmit the rotary motion of said first member into reciprocation of said second member essentially by the use of rolling frictional forces only.

References Cited in the file of this patent

UNITED STATES PATENTS

| 1,321,918 | Herman | Nov. 18, 1919 |
| 1,512,781 | Masland | Oct. 21, 1924 |
| 1,710,347 | Cohen | Apr. 23, 1929 |
| 1,755,511 | Miller | Apr. 22, 1930 |
| 1,806,555 | Gonsett | May 19, 1931 |
| 2,168,703 | Dziedzic | Aug. 8, 1939 |
| 2,189,791 | Gray | Feb. 13, 1940 |
| 2,330,082 | Side et al. | Sept. 21, 1943 |
| 2,348,895 | Gandio | May 16, 1944 |
| 2,539,921 | Neisingh | Jan. 30, 1951 |
| 2,651,148 | Carwile | Sept. 8, 1953 |
| 2,731,721 | Traurig | Jan. 24, 1956 |
| 2,740,417 | Padva | Apr. 3, 1956 |
| 2,747,417 | Brown | May 29, 1956 |
| 2,751,682 | Stout | June 21, 1956 |
| 2,753,470 | Armstrong | July 3, 1956 |